(12) United States Patent
Johnsson et al.

(10) Patent No.: US 9,577,870 B2
(45) Date of Patent: Feb. 21, 2017

(54) ADDRESS ALLOCATION IN A NETWORK

(75) Inventors: Martin Johnsson, Sollentuna (SE);
Reinaldo Gomes, Joao Pessoa (BR);
Judith Kelner, Jaboatão dos
Guararapes (BR); Djamel Sadok,
Jaboatão dos Guararapes (BR); **Ricardo
de Oliveira Schmidt**, Passo Fundo
(BR)

(73) Assignee: **Telefonaktiebolaget LM Ericsson
(publ)**, Stockholm (SE)

(*) Notice: Subject to any disclaimer, the term of this patent is extended or adjusted under 35 U.S.C. 154(b) by 972 days.

(21) Appl. No.: 13/145,856

(22) PCT Filed: Jan. 22, 2009

(86) PCT No.: PCT/EP2009/050732
§ 371 (c)(1),
(2), (4) Date: Jul. 22, 2011

(87) PCT Pub. No.: WO2010/083887
PCT Pub. Date: Jul. 29, 2010

(65) Prior Publication Data
US 2011/0282998 A1 Nov. 17, 2011

(51) Int. Cl.
*G06F 15/16* (2006.01)
*H04L 29/12* (2006.01)
(Continued)

(52) U.S. Cl.
CPC .... *H04L 29/12283* (2013.01); *H04L 61/2061* (2013.01); *H04L 69/40* (2013.01);
(Continued)

(58) Field of Classification Search
CPC ............... H04L 47/70; H04L 29/12226; H04L 29/12283; H04L 61/2015; H04L 43/0817;
(Continued)

(56) References Cited

U.S. PATENT DOCUMENTS

2004/0240474 A1* 12/2004 Fan .............................. 370/475
2006/0137005 A1* 6/2006 Park ............................. 726/21
(Continued)

FOREIGN PATENT DOCUMENTS

CN 1512374 A 7/2004
JP 2003143157 A 5/2003
(Continued)

OTHER PUBLICATIONS

Droms, R. et la. "DHCP Failover Protocol." <draft-ietf-dhc-failover-11.txt>, Network Working Group, Internet Draft, Nov. 2002.
(Continued)

*Primary Examiner* — Jungwon Chang
(74) *Attorney, Agent, or Firm* — Coats & Bennett, P.L.L.C.

(57) ABSTRACT

A method of address allocation in a network comprises determining, from negotiations between nodes, whether a first node shall assume a server role responsible for distribution and management of network addresses to clients. If this determination is made, the first node is provided with a pool of network addresses. The invention provides a method of dynamic re-allocation of address pools between servers of the network, in accordance with, for example, network requirements or traffic load.

22 Claims, 12 Drawing Sheets

When the server receives a "request for server" message

(51) Int. Cl.
*H04L 29/14* (2006.01)
*H04L 29/08* (2006.01)
*H04L 29/06* (2006.01)

(52) U.S. Cl.
CPC .... *H04L 29/12226* (2013.01); *H04L 61/2007* (2013.01); *H04L 61/2015* (2013.01); *H04L 67/104* (2013.01); *H04L 67/1012* (2013.01); *H04L 67/42* (2013.01)

(58) Field of Classification Search
CPC ............. H04L 67/1002; H04L 61/2007; H04L 61/2061; H04L 67/1012; H04L 67/104; H04L 67/42; H04L 69/40; G06F 9/5061
USPC .................. 370/258, 254, 252, 475; 726/21; 709/245, 226, 223–224, 217
See application file for complete search history.

(56) References Cited

U.S. PATENT DOCUMENTS

| | | |
|---|---|---|
| 2006/0148516 A1 | 7/2006 | Reddy et al. |
| 2006/0221846 A1* | 10/2006 | Dyck et al. .................. 370/252 |
| 2007/0274240 A1 | 11/2007 | Weidenhaupt et al. |
| 2008/0008201 A1 | 1/2008 | Imahase et al. |
| 2009/0213763 A1* | 8/2009 | Dunsmore et al. ........... 370/258 |
| 2009/0276520 A1* | 11/2009 | Weerakoon ........... G06F 9/5061 709/224 |
| 2010/0082789 A1* | 4/2010 | Kim et al. .................... 709/223 |
| 2010/0091684 A1* | 4/2010 | Winter et al. ................. 370/254 |

FOREIGN PATENT DOCUMENTS

| | | |
|---|---|---|
| JP | 2004146988 A | 5/2004 |
| JP | 2006501777 A | 1/2006 |
| JP | 2007505588 A | 3/2007 |
| JP | 2008017279 A | 1/2008 |
| WO | 2007/113442 A1 | 10/2007 |

OTHER PUBLICATIONS

Miyakawa, S. et al. "Requirements for IPv6 Prefix Delegation." Network Working Group, Request for Comments: 3769, Category: Informational, Jun. 2004.

\* cited by examiner

Tree-format server's hierarchy

A simple scenario with servers and clients interaction

When the server receives a "request for server" message

When the server receives a "cancellation request" message

When the server receives an "announcement reply" message

When the server receives an "error report" message

When the server receives a "request for pool" message

When the server announces itself

When the new node sends a "request for server" message

When the new node receives an offer to establish an n-hop connection

When the new node starts its communication with a server intending to establish a connection When the client receives a "request for server"

When the client receives a message to be bridged

When the client receives a "server announcement" message

When the client receives an offer to become a server

When the client decides to terminate the communication with its server

Message exchange between server and its backups

Backups reaction when facing a server failure

Second level backup reaction when facing a server and first level backup failure Complete procedure when a server fails Original server's hierarchy Relation between father servers and child ones

| Server A | |
|---|---|
| Pool # | To... |
| 1A | Myself |
| 2A | AA |
| 3A | AB |
| 4A | |
| ... | ... |
| nA | |

| Server AA | |
|---|---|
| Pool # | To... |
| 1AA | Myself |
| 2AA | AAA |
| 3AA | AAB |
| 4AA | |
| ... | ... |
| nAA | |

| Server AAA | |
|---|---|
| Pool # | To... |
| 1AAA | Myself |
| 2AAA | |
| ... | ... |
| nAAA | |

The relation among the server on the pool's distribution

When the client receives an offer to become a backup

ADDRESS ALLOCATION IN A NETWORK

TECHNICAL FIELD

The present invention relates to address allocation in a network, and in particular to the dynamic allocation of a pool of network addresses to a network node that has a server role responsible for distribution and management of network addresses to nodes having a client role.

BACKGROUND

The idea of creating autonomous computer systems relies heavily on the concept of autoconfiguration in a computer network. The establishment of communication in dynamic networks without users' interference is one of the most important topics for next-generation computer networks. One of the biggest challenges related to autoconfiguration in dynamic networks is addressing—the automatic distribution and management of addresses in a network is a critical part of an autonomous communication environment that is further made complex by the presence of challenges such as mobility, policies control and intermittent connections.

In future networking, it is expected that nodes will connect to and disconnect from a network without the need for a user to manually change a device configuration. Through a robust mechanism for automatic bootstrapping, a node may configure itself by contacting an existing node of the network which the node wishes to join, and initiate communication. Several approaches have been proposed to achieve self-configuration. Examples of these include mechanisms for dynamic addressing, addressing management, and dynamic configuration of ad hoc networks.

Methods of defining an address for a node in a dynamic environment are known, but these often rely on the presence and the help of a fixed and structured network, where a DHCP (Dynamic Host Configuration Protocol) or another kind of mechanism is available. Other solutions describe a mechanism where the node refers to its hardware address (e.g. a physical address such as a MAC—Medium Access Control—address) and uses this information to calculate its own network address. Nonetheless, when an address is self-attributed, there is a need for a mechanism that prevents nodes from using addresses that were already allocated to others. Similarly, other proposals suggest that a node may create its own network address by combining information from its physical address and pre-defined network related information in order to avoid addressing conflicts as described for example in US Patent Application US 2003/0081578, US Patent Application US 2004/0240474 A1, or U.S. Pat. No. 6,728,232 B2.

Other solutions have considered a mechanism whereby a node takes information from advertisement messages sent by a server and combines it with information about its own interface type, or other pre-defined information, creating its own valid network address—see US Patent Application US 2007/01600514. However, this again requires the provision of a fixed server.

Further strategies have been proposed for a node connected to a home domain using a specific address. When moving to other regions and interacting with other domains, the node receives or calculates a temporary address to be used during the time it remains away from its home domain—see for example U.S. Pat. No. 5,708,655 or Charles Perkins, "IP Mobility Support for IPv4", RFC 3344, August 2002.

Trial and error ("heuristic method") is a common methodology used in many domain problems. In the addressing context, a node would simply generate its own address. This node then verifies whether this address is already in use by another node in the network. If not, the node attributes to itself the generated address.

It has also been proposed to provide one or more servers carrying an amount of available addresses. These servers are responsible for the management of address pools from where the nodes take their valid addresses—see, for example U.S. Pat. No. 6,993,583.

SUMMARY

A first aspect of the invention provides a method of address allocation in a network. The method comprises determining, from negotiations between nodes, whether a first node shall assume a server role responsible for distribution and management of network addresses to clients. If this determination is made the first node is provided with a pool of network addresses.

It should be noted that the term "first node" is used to allow consistent identification of a particular node in the description. The term "first node" does not require that the node is chronologically the first node to request association with the network after start-up of the network. In some embodiments described below the first node is already associated with the network, while in other embodiments the first node is a node that is requesting association with the network.

A server node may provide the first node with the pool of network addresses. (The server node that provides the pool of network addresses may have made the determination that the node should assume the server role, but the invention does not require this. Only a node that assumes the server role can be allocated a pool of network addresses.) The invention thus provides dynamic re-allocation of address pools between servers of the network, in accordance with network requirements. The re-allocation of address pools occurs as a result of negotiations between nodes in the network, and so can be said to occur automatically in the sense that the network does not require a component for centralised allocation of address pools to servers. (The method requires that the network is initially allocated a pool of network addresses. This may be done in any suitable way:—as an example, a network manager may initially configure one node in the network as a server and provide the pool of network addresses. Then, the next node that enters the network will be offered a valid address by this already existing server—the invention relates to the manner in which the network addresses assigned to the network are subsequently allocated between nodes of the network.)

The determination may be carried out at one of the following:
 at start-up of the network;
 upon the first node requesting association to the network;
 upon a server node of the network becoming overloaded; or
 at the occasion of a server node of the network leaving the network.

The invention is not limited to carrying out the determination on one of these occasions, and it may be carried out on other occasions. For example, if a network node is seen to be acting as a bridging node (that is, it is relaying traffic from client nodes to a server node), the network node may be made an offer to become a server.

When the determination is carried out upon the first node requesting association to the network, if the determination is that the first node does not assume a server role, the first node may instead be offered a client role in the network.

In other embodiments the first node is an existing client node of the network.

If the first node assumes a server role, the method may comprise subsequently providing the first node with a further pool of network addresses. If the first node requires more addresses than in its original address pool to allocate to its clients, it can negotiate with other servers in the network to obtain more addresses. The further address pool may come from the same server that provided the original address pool, or it may come from another server in the network.

The server node may subsequently take back responsibility for the pool of network addresses allocated to the first node upon the first node assuming the server role (which may include addresses that the first node has in turn allocated to subsequent servers) upon receipt of an indication that the first node is no longer carrying out the server role. The indication may for example be a failure of communications with the first node which may result from, for example, the first node leaving the network or failure of the first node.

The server node may wait for a pre-determined time period after receipt of an indication that the first node is no longer carrying out the server role before re-assuming responsibility for the address pool. If communications with the first node are temporarily lost owing to a failure of a communications link, this allows the first node to retain its original address pool when the communications link is re-established and so avoids the need for the first node to assign new addresses to its clients.

The server node may avoid taking back responsibility for addresses in the first address pool that the first node has allocated to one or more further servers. Addresses that the first node has allocated to any further servers may stay with the further server(s), thereby avoiding the need to provide these further servers with new pools of network addresses.

When the determination is that the first node shall assume a server role, the first node may subsequently elect at least one node of the network as a backup server. The first node may elect at least one of its client nodes as a backup server. If the first node should fail, its role may be assumed by a backup server.

A second aspect of the invention provides a method of associating a node to a network. The method comprises sending an association request from the node to the network. Upon receiving, at the node, a response from a node of the network, the node determines whether the received response is from a client node of the network or a server node of the network. The node may then associate to the network as a client or as a server in accordance with the response received.

If the node receives a response from a server node of the network, the node may associate to the network either as a client or as a server as determined from negotiations between the node and the server node.

If the node receives no response from a server node of the network but receives a response from a client node of the network, the node may associate to the network as an n-hop client (n>1). An "n-hop client" is a client that is not associated directly (that is, by one network link) to a server, but that is associated to a server via at least one intermediate client (known as a "bridging node").

If the node associates to the network as a server, the method may further comprise the node receiving, at the node, a pool of network addresses for distribution to clients.

A third aspect of the invention provides a network node adapted to: determine, from negotiations between nodes, whether a first node shall assume a server role responsible for distribution and management of network addresses to clients; and if so, arrange for the first node to be provided with a pool of network addresses.

The network node may be a server directly or remotely associated to the network, that itself will provide the pool of network addresses to the first node if the determination is that the first node shall assume a server role.

A fourth aspect of the invention provides a network node, the node being adapted to: send an association request to a network; receive a response from a node of the network; determine whether the received response is from a client node of the network or a server node of the network; and associate to the network as a client or as a server in accordance with the response received.

A fifth aspect of the invention provides a computer-readable medium containing instructions that, when executed on a processor, cause a network node to perform a method as defined in the first or second aspect.

The present invention provides a method of "self-organisation of addresses" ("SooA") within a network. The SooA is a mechanism that effects distribution and management of addresses in a network, and allows pools of network addresses to be allocated to servers in a network in a dynamic manner—that is, the pool of network addresses allocated to a particular server is not fixed but may change over time in accordance with, for example, network requirements and/or traffic conditions in the network. In contrast to the prior methods described above, the SooA is completely autonomous—while some prior solutions use to DHCP or other mechanisms to manage address distribution, the SooA defines a self-configuring environment where no other support mechanism is needed. Using the idea of dynamically assigned address pools, the proposed strategy implements a robust, distributed, scalable, and auto-manageable address allocation mechanism.

Existing solutions for providing dynamic addressing in dynamic networks generally apply to structured networks, where a central mechanism responsible for addressing, such as DHCP, is offered. Even when described as solutions for dynamic networks, prior solutions fail to be generally applicable, i.e. are not applicable for all situations where a dynamic network is defined. In a scenario where no association with a structured network is possible, DHCP among others, may not be available to manage address distribution. IN particular, the startup of a dynamic network is a critical phase mainly when self-addressing must be supported.

There are many prior solutions that assume the absence of a DHCP in a network and usually rely on the concept of address pools. However, the mere division of network addresses into pools and distributing them among servers remains insufficient. A robust management over this address distribution is required especially in highly dynamic and unstructured networks. Additional protocols are required for the management of the distributed addresses.

This invention defines a mechanism for allocating addresses (or bootstrapping addressing) in self-configuring networks. Address allocation is critical to the remaining functionalities of the network. Current solutions for addressing in dynamic networks generally rely on the use of DHCP or another fixed mechanism to provide valid addresses and manage them. This invention distributes addresses without the support of a pre-defined and/or fixed external entity. Moreover, current solutions for addressing usually require a big stack of protocols to manage the distribution. The mechanism of this invention uses only one protocol that integrates all necessary functions to guarantee an efficient addressing.

Overall, self-bootstrapping is the first step and the base functionality for self-configuring networks. Self-configuring networks depend directly on efficient self-address allocation to provide association among the nodes associated to the network.

The SooA method of the present invention provides a mechanism for self-distribution and self-management of network addresses in a dynamic network.

The SooA method of the present invention is a mechanism that organizes some or all nodes within a network in, for example, a hierarchical structure composed of nodes assuming a server role ("servers") and nodes assuming a client role ("clients"). The servers have an objective of taking care of the address allocation process, and are responsible for both distribution and management of the addresses. Each server is provided with at least one pool of network addresses. Through the interaction among the servers, the available addresses are spread in the network and attributed to nodes that want to associate to some other servers and nodes to establish a communication channel. One or more security mechanisms are preferably used in the SooA method of the present invention in order to guarantee the correct access and utilization of networks' resources, e.g. authentication, cryptography, etc. The servers responsible for address allocation may themselves be arranged in a hierarchy, as shown for example in FIG. 1 or FIG. 21. (It should be noted that there may be further servers in the network that are not part of this server hierarchy.)

When a node (which may be a new node or an existing client node of the network) assumes a server role in the network, another node that already functions as a server provides an available address pool to the new server node. This allows the addresses to be distributed among the servers, which then may allocate them to clients and other servers This distribution creates an address allocation hierarchy that follows a tree-format structure as shown in FIG. 1. In the structure of FIG. 1, server 10.2.0.0 and server 10.3.0.0 are each below server 10.0.0.0 in the hierarchy, and server 10.3.2.0, server 10.3.3.0 and server 10.3.4.0 are each below server 10.3.0.0. This structure behaves similarly to, for example, the DNS structure but instead of controlling names to addresses translations, our solution stores information relevant to the delegated addresses and which node is managing this information. Using this structure the nodes are capable of consulting and answering other servers in a very efficient and scalable way, since the information base is distributed in a dynamic but structured way.

The nodes having a client role (or "clients") do not have any control over the addressing. However, they play a fundamental role when enabling the association among other clients and servers. When a node wants to associate to a network, it initiates a server lookup procedure. A client that is already associated to a server can bridge the communication between the new node and the server. Thus, if the node is not close enough to a server to get directly associated to, it can use the existing client to reach such server. (As described in more detail below, a server node may also take on a bridging role.)

If a server sees that a client has been often used as a bridge it may, depending for example on a configurable threshold value of requests or its current workload, elect such client to become a server at a level beneath it.

An overloaded server, and which still has unallocated addresses, may also chose to divide its workload by shifting one or more (or even all) of its clients to new servers. The server invites an existing client to become a new server by sending it a message and, if possible, the client becomes a new server gathering part of the workload from its "parent server".

To keep a better control of address distribution, every server keeps a history of all addresses allocated to its clients and all pools distributed to other servers. With this tracing the invention avoids the loss of addresses. This is important because, with this control, the invention does not need any additional protocol for addresses' management.

The creation of the "first level" of servers (eg, the creation of server 10.0.0.0 in FIG. 1) presents a challenge in automated environment. The present invention does not address this initial generation, which may be carried out in any suitable way. The description of the invention will assume that the initial nodes have received some information indicating the pools of network addresses that will be managed by them. For example, a static configuration or a policy may be used to specify this allocation. These initial servers can be compared to DNS root servers which present less dynamism and more computational capabilities.

BRIEF DESCRIPTION OF THE DRAWINGS

Embodiments of the invention will be further described, by way of example, with reference to the accompanying drawings, in which.

DETAILED DESCRIPTION

Figure 1:
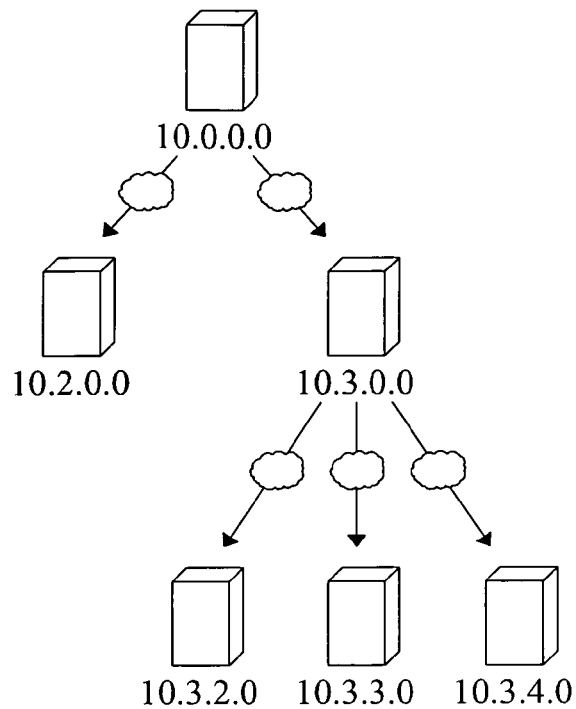
FIG. 1 is a schematic diagram illustrating a server hierarchy.
Figure 2:
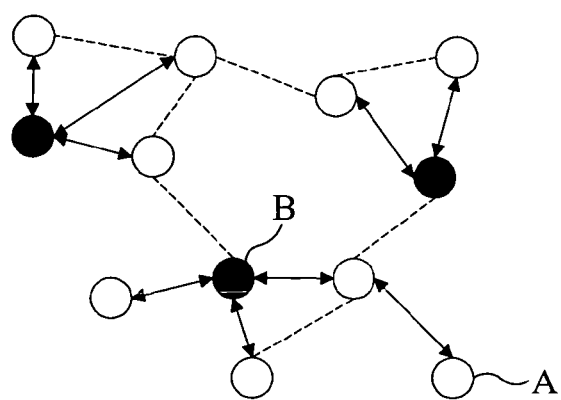
FIG. 2 is a schematic diagram of a network having clients and servers.

FIG. 2 illustrates a basic scenario where address distribution is dealt with by servers spread across the network (black circles). The servers provide a valid address to each of their clients. A client (white circles) does not necessarily need to be associated directly to a server (i.e. throughout an 1-hop association). When a new client establishes a link to the server throughout another client, it is said that this new client is, at least, 2-hops distant from the server. In FIG. 2, client A is 2-hops distant from server B, and all other clients are associated directly (i.e., by a 1-hop association) to their respective server.

In FIG. 2, the links between servers and their respective clients are represented by two-way arrows. The links which do not represent the server-client hierarchy are drawn as dotted lines. In the first case an "addressing relationship" is established between the nodes indicating that in these links all the management information to keep nodes and servers aware of address allocation and availability will be transmitted. On the other hand, dotted lines represent links which will be used only to exchange data between the nodes. (It should be noted that there will in general be an addressing relationship between the servers shown in FIG. 2 (possibly involving one or more higher level servers that provided the servers shown in FIG. 2 with their address pools); this addressing relationship is omitted from FIG. 2.)

The invention is composed of an autonomous mechanism to distribute and manage addresses in a self-configuring network. Three elements represent the status that a node can assume in the network: the new node, the server, and the client. The node that first associates with the network as a new node upon or after start-up of the network will, after verifying the absence of other nodes in the network (the procedure for verifying the absence is out of the scope of this invention and any suitable procedure may be used), start negotiations for a server status. A node that subsequently associates with the network as another new node will be the subject of negotiations to determine whether it associates with the network as a client or as a server. Embodiments of the invention are described with reference to general ad hoc networks (which may or may not be mobile networks) since these networks present a higher dynamism, but this invention is not restricted to them.

Server Elements

As the servers are responsible for address distribution and management, their functionality related with addressing is more complex than that of the clients. Nodes that have adequate processing and storage capacity are natural candidates for servers. Node stability can be seen as an attribute that reflects a combination of processing power, storage space available at a node, and a risk of the node leaving the network. (It is desirable that a node acting as a server has a low risk of leaving the network, as clients of the server would have to get new addresses if the node were to leave the network). Such attribute may be made known to an existing server when a node enters a network. Although such information may be highly dynamic, it may be defined in terms of levels, for example as: very stable, stable, unstable.

There are a number of ways in which a node may assume the role of a server. Seeing the need to create a new server may for example come as a result of:

(a) an existing server attempting to offload some of its work;

(b) a node acting as a bridge on the behalf of many other nodes;

(c) before/when a server shuts down or leaves the network;

(d) creation of one or more sub-networks.

When an existing server in a network perceives the need to create a new server, the server may then ask a node having an existing association with the network to become a server after examining the node for suitability, for example by examining its stability information level. Note that, one may allow for a such request to be turned down by a candidate node. This is why, such request requires confirmation.

The first action executed by a server is its self-announcement through a broadcast message. Next, the server enters an initial state where it listens and waits for any message from its clients or from a new node.

Prior to receiving a network address, nodes may be identified through, for example, their MAC address and communication channel type or technology. Optionally they also may use a temporary identification, e.g. self-assigned address which is calculated by each node when it starts to operate. This allows all nodes to use routing functionalities and then communicate with all the elements in the network at all times, even if the network is not connected to the Internet. Any suitable mechanism for providing a node with a temporary identification or address for use before it joins the network may be used, and the invention is not limited to any specific method for this. In addition to the MAC address mentioned above, other forms of node identity (e.g. based on cryptographic properties) could alternatively be used.

Figure 3:
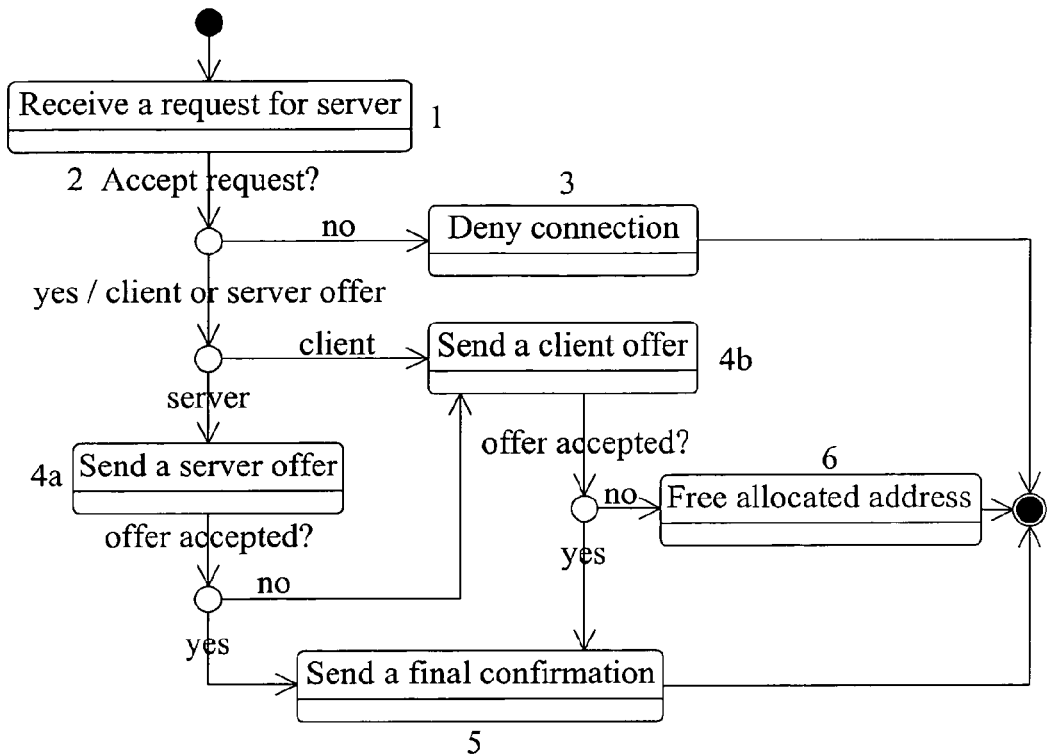
FIG. 3 is a schematic flow diagram of a method according to an embodiment of the invention.

FIG. 3 illustrates an activity sequence when a server receives a request from a node.

When a request from a new node is received (step 1), the server checks its cache table to determine whether the new node was already denied. If this is the case, the server does not reply, it updates its cache table information, and returns to the initial state. Otherwise, the server decides (step 2), based on some pre-defined policies, whether it accepts the new node or not. Note that such decision may be made locally at the server or through the help of remote nodes. The cache table is used to keep information about the recent denials and the reasons for doing so, in what could be similar to a "black list" of nodes. By consulting this cache table a server may save time and effort.

If the server decides to deny the new node's request (but the node has not previously been denied), it sends a denial message to the node (step 3), and updates the cache table with the node's identifier or temporary/self-assigned identification and the reason for denying the request. To avoid problems with (D)DoS attacks the requests may be authenticated, and black lists may be exchanged among the servers.

If the server decides to accept the new node's request it sends (step 4a, 4b) an offer message containing the offered addressing configurations and waits for the node to confirm its acceptance of the offer made by the server. At this moment, the server marks the status of the offered address as "reserved". On receiving a confirmation from the client, the server sends a final confirmation (step 5), and assumes that an association is established with the new node and that the configuration process was correctly done. After that the server changes the status of the address to "allocated", and returns to its initial state. If the node does not respond to the offer message the server retransmits the offer message after a determined period of time. If a pre-set maximum number of retransmissions is reached and no confirmation is received from the new node, the server frees the reserved address (step 6) and returns to the initial state.

According to one embodiment of the invention, when a server receives a message from a node wishing to associate to the network, it may invite the node to associate as a server or as a client. In this embodiment, when the server decides that a new node should become a server, it sends (step 4*a*) a message containing information and an address pool allowing the new node to establish a server configuration ("server offer"). The server then waits for a response. If the new node denies the "server offer", the server sends (step 4*b*) another message containing information only allowing the new node to become a client and executes the same process described above (i.e., waits for a confirmation and after sends a final confirmation message). If the new node accepts to be a new client, the server sends a final confirmation and returns to the initial state. A similar process may be used when a server invites an existing node to become a new server but in the case of refusal by the node, the server then takes no actions.

Figure 4:
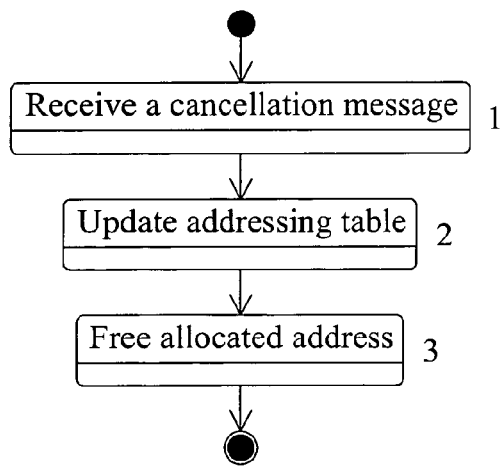
FIG. 4 is a schematic flow diagram of a method according to an embodiment of the invention.

An existing network node acting as a client may also send a message to its server. FIG. 4 shows the steps carried out at the server in this case. At step 1, a server receives a cancellation message from one of its clients. This allows the server to update its address table (step 2) to free the address that this client was using (step 3), and return to the initial state (see FIG. 4).

Figure 5:
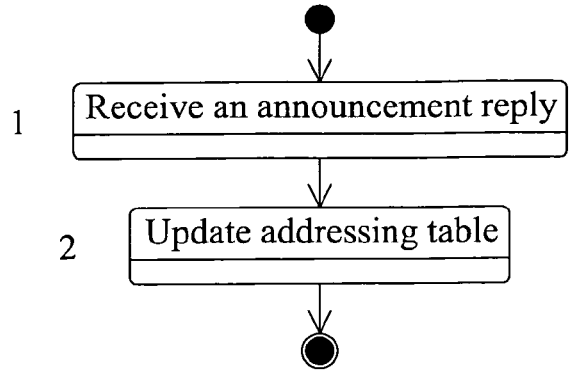
FIG. 5 is a schematic flow diagram of a method according to an embodiment of the invention.

A server can also receive a reply to a previously made announcement. FIG. 5 shows the steps carried out at the server in this case. Here, the server receive a reply to a previously made announcement (step 1), updates its address table (step 2) and returns to the initial state. This provides a method for the server to check the status of clients, and may be carried out at intervals to provide the server with updated status information.

Figure 6:
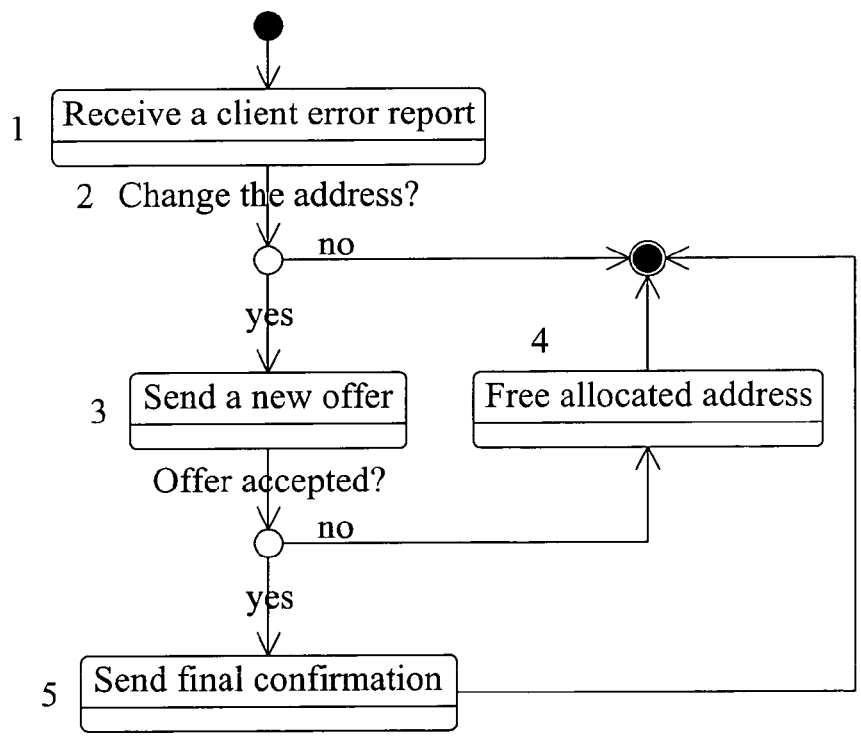
FIG. 6 is a schematic flow diagram of a method according to an embodiment of the invention.

Additionally, the server can receive a client error report. FIG. 6 shows the steps carried out at the server in this case. When the server receives a client error report (step 1), the server determines (step 2) whether the address should be reconfigured. If the server decides that the address must be changed, the server frees the currently-allocated address and starts a new configuration process sending an offer message to the client (step 3). If the offer is rejected the address allocated in the new offer is freed (step 4). If the offer is accepted the server sends a final confirmation message (step 5) as described above.

Figure 7:
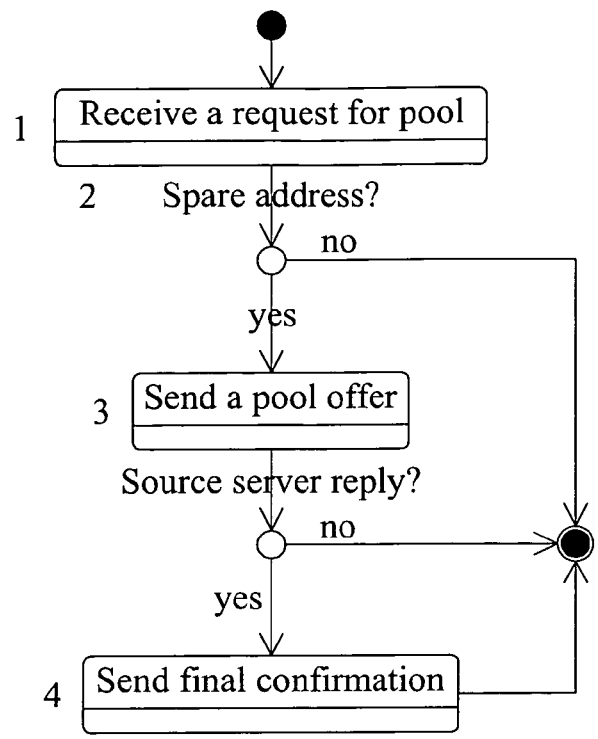
FIG. 7 is a schematic flow diagram of a method according to an embodiment of the invention.

It is also possible that a server receives a request from another server. For example, when the server X needs to add more addresses to its pool, it sends a message asking for such addresses to a server Y (which will usually be the parent server of server X). This is shown in FIG. 7. At step 1, the server Y receives a message from server X asking for addresses to add to its pool. Server Y checks (step 2) whether it has available addresses. If server Y has available addresses, the server Y sends an offer message (step 3) to server X and waits for a reply. When receiving a confirmation reply from server X, server Y sends a final confirmation (step 4) and goes back to the initial state. Otherwise, server Y frees the allocated addresses (not shown) and returns to the initial state.

If the server Y does not have available addresses, server Y may in turn request further addresses from its parent server, instead of simply denying the request. This process may be repeated (that is, the request may be passed to higher serves) until one of the involved servers above server Y offers a new pool of addresses, and this pool is then forwarded until it reaches the server Y. Upon receipt of the address pool, the server Y may then send an offer to server X.

If the server Y does not have available addresses, and cannot obtain addresses from higher serves, the server Y may just ignore the request from server X and returns to the initial state, or it may send a rejection response to server X. If the server X does not receive a reply from server Y it just assumes that the server Y does not have an address pool to be offered.

An analogous procedure may apply when a server sends a server error report.

A server needs to announce itself periodically to the network. When it is time to do so, the server checks whether there are any n-hop clients (n>1) to ensure that they also receive its announcements and updates. A server gets to know about such clients when the clients register through a sequence of bridging nodes.

Figure 8:
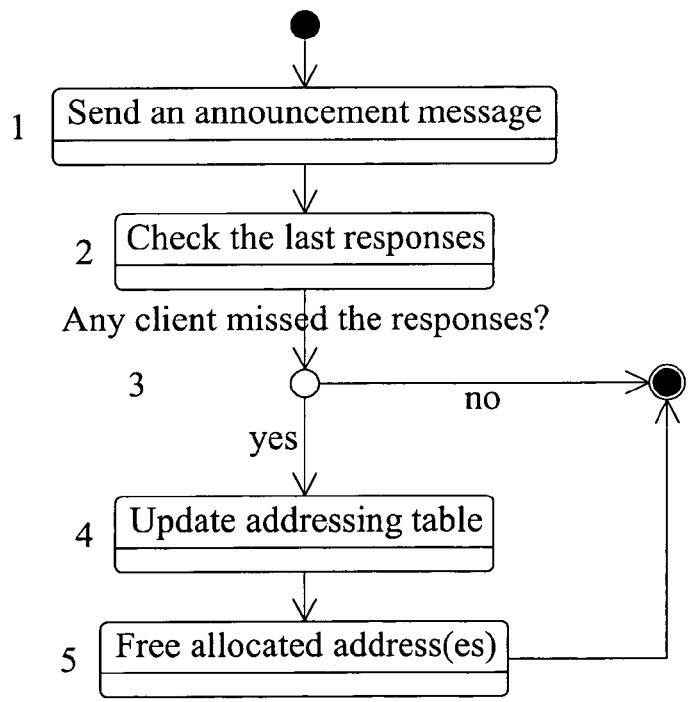
FIG. 8 is a schematic flow diagram of a method according to an embodiment of the invention.

FIG. 8 shows the procedure for a server announcing itself to the network. If there are no n-hop clients, the server broadcasts (step 1) an announcement message to its immediate nodes. Otherwise, if there is at least one n-hop client, step 1 comprises the server sending a multicast message to be sure that every client is reached by this announcement. After sending the announcement message, the server checks the clients' replies (step 2) to detect (step 3) which are still active (on the assumption that a client that fails to reply is no longer active) and hence rebuilds its address table (step 4) by deleting clients that are judged to be inactive. Those clients that did not reply to a specific number of consecutive announcements are considered dead clients (inactive nodes) and the addresses allocated to these clients are freed (step 5). The server then returns to the initial state. (Of course, if all clients reply to the announcement message, there is no need for the server to update its address table.)

Finally, a procedure for a server to check its workload can run at the end of the process of accepting a new client. If a server evaluates that it has become overloaded, it may start a negotiation with a client in the network and ask it to become a new server and assume part of its current workload.

New Node Element

Figure 9:
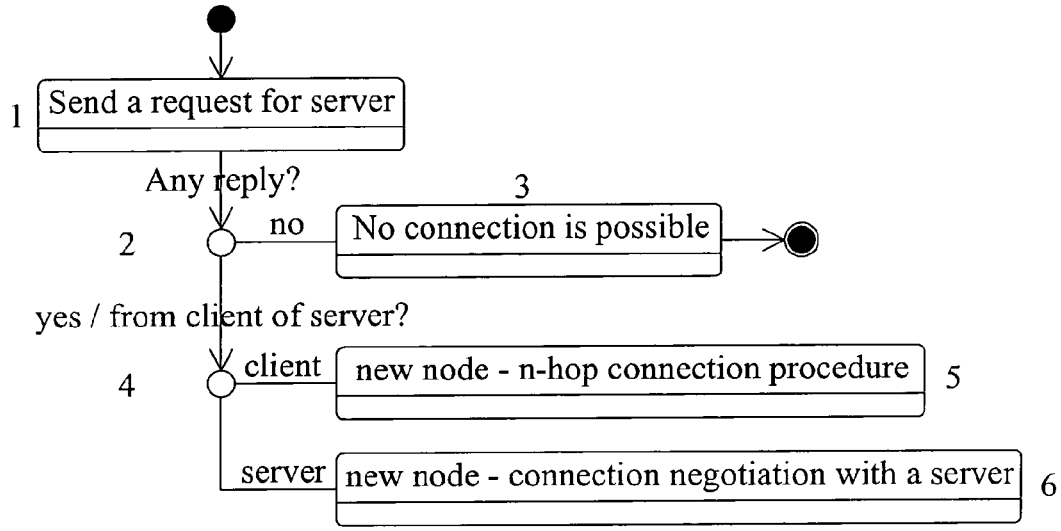
FIG. 9 is a schematic flow diagram of a method according to an embodiment of the invention.

FIG. 9 illustrates a procedure for a new node to associate to an existing network. This procedure is executed every time a new node wants to associate to an existing network and tries to establish a link with a server. First, the new node broadcasts (step 1) a lookup request called "server message". If the node determines (step 2) that it receives no reply in a determined maximum period of time, it assumes that no association is possible (step 3).

If the new node receives a reply to its announcement, such message may have two different origins: it may be from another client or from a server. Thus, if the new node determines at step 2 that a reply is received, at step 4 the new node determines whether the reply is from another client or from a server. If the reply comes from a client, the node decides if it is interested to establish an n-hop association with a server (n>1). If the node does not wish to establish an n-hop association, because of some pre-determined policy or reason, it may assume, in the absence of a reply from a server, that no association is possible or may restart the procedure broadcasting a request for server. This may be repeated a number of times. If the node decides that an n-hop association with a server is adequate to its working, it establishes such an n-hop association (step 5).

If, alternatively, the node determines at step 4 that the reply is from a server, it negotiates an association with that server (step 6).

Figure 10:
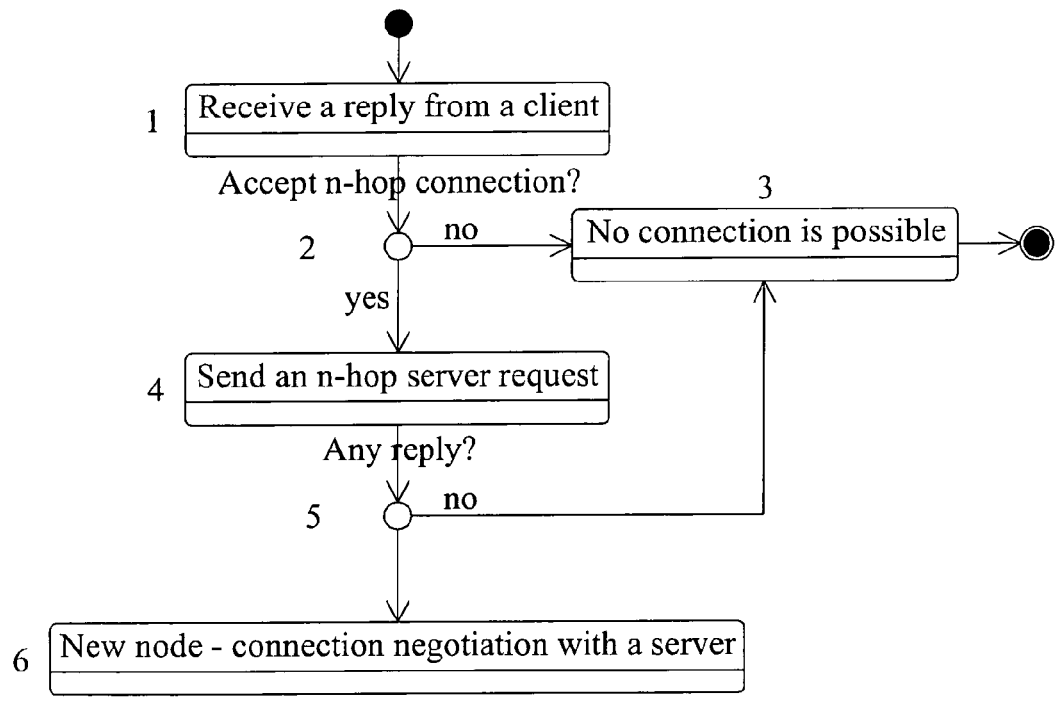
FIG. 10 is a schematic flow diagram of a method according to an embodiment of the invention.

FIG. 10 illustrates in more detail the steps carried out when the node receives a reply from a client (step 1). At step 2, the node decides whether to accept the n-hop association to the network via the client that has replied. If the node decides that it does not wish to establish an n-hop association, it assumes that no association is possible (step 3). (The node may then repeat the process of sending a request for a server.)

If the node decides at step 2 to accept the n-hop association to the network, it sends (step 4) a request for "server message" through the "bridge client" and waits for a response from the server (step 5). If the node does not receive a response in a pre-determined period of time, the node assumes that no association is possible (step 3) (and may restart the procedure by broadcasting another request for server). If the node does receive a reply from the server, via the client, the new node starts the address negotiation process with the server via the client (step 6).

If the new node receives a response from a server when the new node broadcasts its server request at step 1 of FIG. 9, the node can accept or deny the offer. A new node may receive more than one offer message from either servers or clients. However, the new node must answer only one of them. As stated above, in the present invention such offer can be to become a new server or to become a new client.

Figure 11:
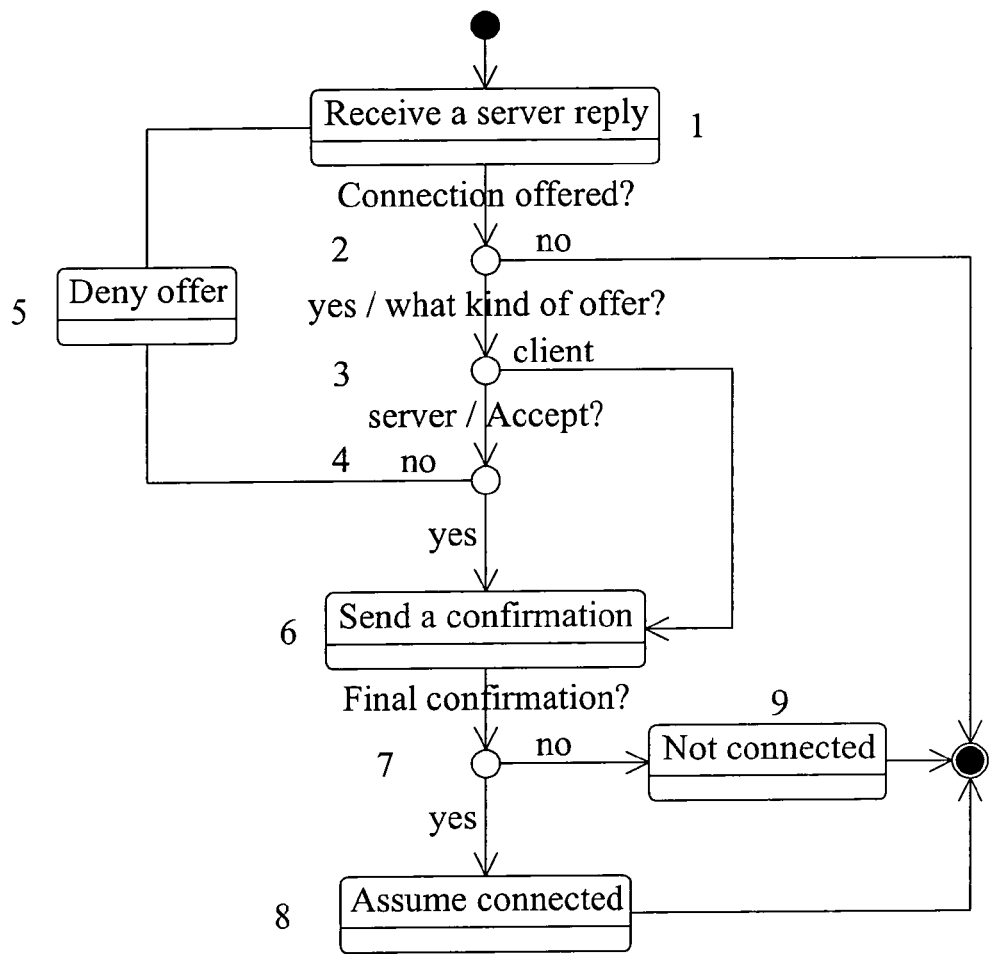
FIG. 11 is a schematic flow diagram of a method according to an embodiment of the invention.

FIG. 11 illustrates the process of the negotiations with a server. At step 1 the new node receives a reply from a server (in response to the server request sent at step 1 of FIG. 9). At step 2 the node determines whether the server has offered an association; if the server has not offered an association then the process ends. If an association is offered, the node determines at step 3 whether the offer is a client offer or a server offer. If the offer is to become a new server the node decides at step 4 whether to accept this offer. If the new node does not want to accept the server offer the node denies the server offer (step 5); the new node may then waits for a response from the server (or another server) offering an address to become a new client.

If the new node decides to accept the offer to become a new server, it confirms the offer at step 6 and waits to see whether a final confirmation is received from the server. On determining receipt of the final confirmation (step 7), the new node shifts its status to server and assumes it is associated to the network (step 8). If however the new node determines at step 7 that final confirmation is not received, it assumes that the attempt to associate to the network has failed (step 9).

If the new node determines at step 3 that the offer is to become a new client, the node confirms its interest by sending a confirmation (step 6) and waits for a final confirmation from the server. When the node determines receipt of the final confirmation from the server it shifts its status to client, and assumes it is associated to the network (step 8). If however the new node does not receive final confirmation from the server, it assumes that the attempt to associate to the network has failed (step 9).

Client Element

When a new node wants to associate to an existing network, it follows the procedure described above. If the new node establishes an association with a server, the new node associates to the network as a client and starts to operate with the following procedure.

The client starts listening for unicast, multicast, or broadcast messages. There are three possible types of communications in which a client can be involved.

Figure 12:
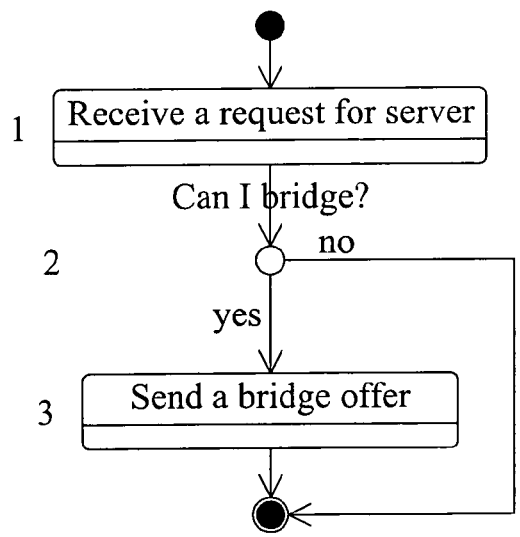
FIG. 12 is a schematic flow diagram of a method according to an embodiment of the invention.

The first type of communication occurs when an already configured client receives a request for server sent by a new node. When the client receives a request for a server sent by a new node (step 1 of FIG. 12) the client analyzes the possibility to become a bridge between the new node and an existing server in the network. If this is possible and the client decides (step 2 of FIG. 12) to become a bridge, the client sends (step 3 of FIG. 12) a message to the new node offering help on establishing a communication with a server. Otherwise, the client just ignores the request and returns to the initial state. This is communication between a client and a new node.

Figure 13:
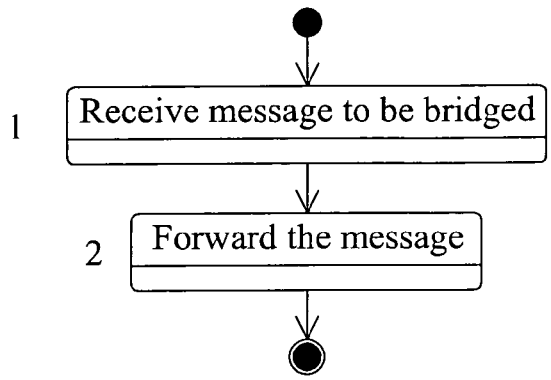
FIG. 13 is a schematic flow diagram of a method according to an embodiment of the invention.

The second type of communication may originate from a new node, and which via a "bridged client" needs to be forwarded to the server. The message is the same as the one defined by a direct association to a server. The difference is that the message needs to be routed (forwarded) by the client to the server, since the new node is not able to reach a server directly. In this case the bridging client, after receiving the message (step 1 of FIG. 13) just forwards the message (step 2 of FIG. 13) and returns to the initial state. This is the communication between a server and an n-hop new node via a bridging client.

Figure 14:
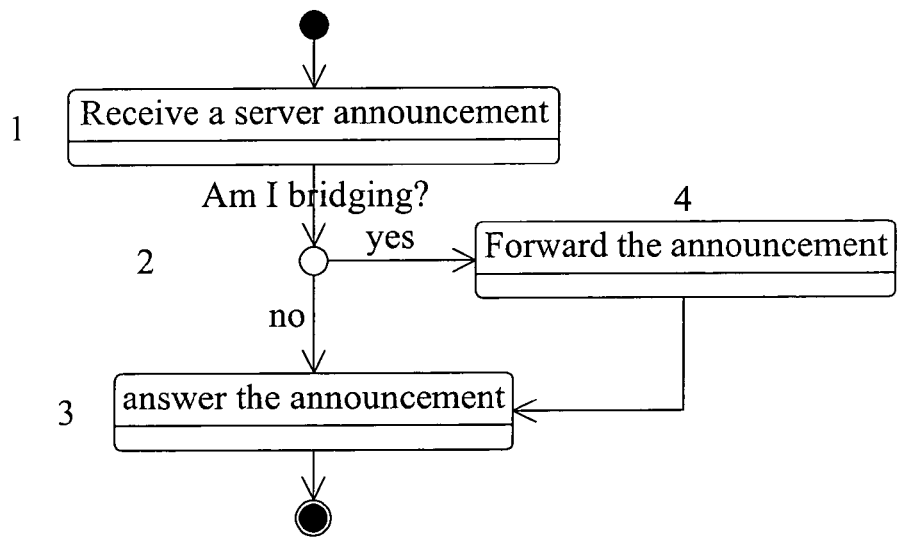
FIG. 14 is a schematic flow diagram of a method according to an embodiment of the invention.

A third communication type a client is likely to receive when listening is from a server. This communication is used by announcements or offers to clients to become new servers. FIG. 14 shows the steps when the message is an announcement. In the case of receiving a server announcement (step 1 of FIG. 14) the client simply replies to the announcement (step 3 of FIG. 14) and returns to the initial state. If the client hasn't received a server announcement within a certain time limit, the client will assume that the server is dead, and will compulsorily cancel its address lease and then also quite its client role in the network. The client will also determine if it is bridging the communication between another client and the server (step 3 of FIG. 14), and if so the client also forwards the server's announcement to the client(s) for which it acts as a bridge (step 4 of FIG. 14). This is communication between a server and a client.

Figure 15:
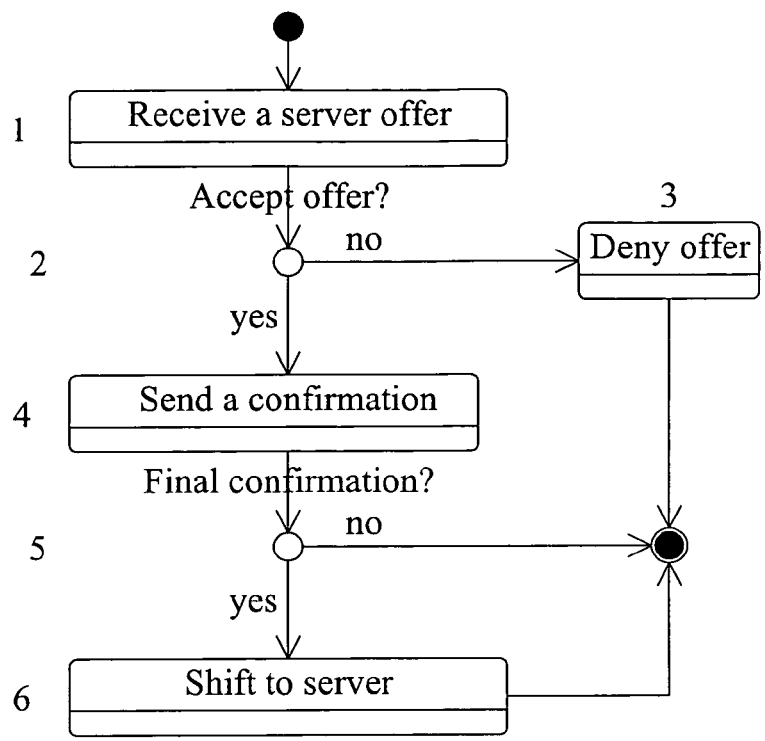
FIG. 15 is a schematic flow diagram of a method according to an embodiment of the invention.

If the message received at a client is an offer to become a server, the client can deny or accept such offer. FIG. 15 illustrates the procedure in this case. In the case of receiving a server offer (step 1 of FIG. 15) the client determines whether to accept the offer (step 2 of FIG. 15). If it is not possible, for some specific reason, to become a new server, the client sends (step 3 of FIG. 15) a message refusing the offer and returns to the initial state. If however the client decides to accept the offer it sends a confirmation message to the server (step 4 of FIG. 15) and waits for a final confirmation. Upon determining receipt of the final confirmation (step 5 of FIG. 15), the client sets its status to server (step 6 of FIG. 15). If, however, the client determines at step 5 that final confirmation has not been received in a per-set time period its acceptance of the offer lapses.

Figure 16:
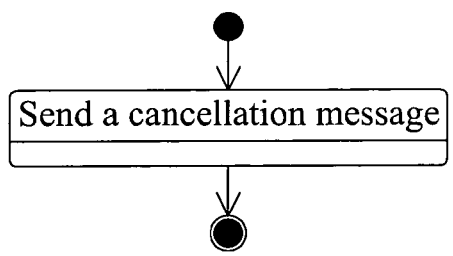
FIG. 16 is a schematic flow diagram of a method according to an embodiment of the invention.

The client may also decide to cancel the address lease with its server. In this case, the client sends a message to the server affirming that it will not use the address from this time forth and, without any further negotiation or warning, quits the client role in the network (see FIG. 16).

Backup

In a network it is usual for a server to have at least one back-up server that can take-over if, for example, the server should suffer a fault. For an autonomous network to be fully effective, it must have a mechanism for providing a back-up server to a server in the network, and for enabling a back-up server to automatically take over if a server fails (this is sometimes known as "self healing"). The backup and the self-healing mechanisms have the objective to guarantee the integrity of the addressing management. Both attempt to recover the network after going through a critical situation like a server or a link communication failure. A further feature of the invention relates to the provision of back-up for a server.

Preferably, each server in the network will have by default two backup servers.

This redundancy is to ensure recovery even if a server and its backup fail. Failures are more likely in highly dynamic networks than in traditional ones. The two backup servers are classified as first level backup and second level backup. Only the first level backup server has a direct communication with the server. The second level backup server exchanges messages with the first level backup server in order to be aware of the network state including failures.

Backup's Election

Election of a backup server is performed by the server. As a server has state and stability information about its clients, it is in a suitable position to select its backup(s) from among the clients. As an example, the information about the clients may be collected by a higher level protocol that deals with network's configuration parameters—but the server may select its backup servers in any suitable way, and the invention is not limited to any particular way.

Interaction Between Server and Backups

Figure 17:
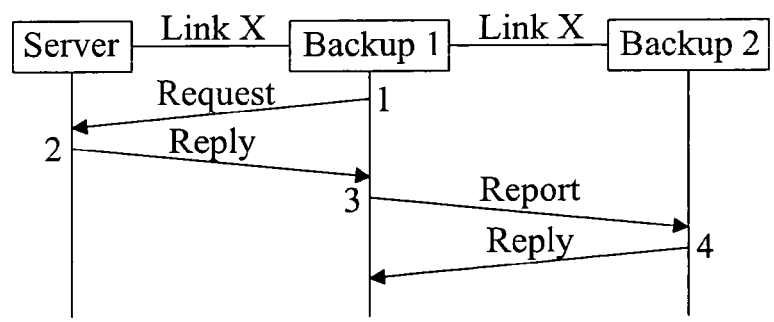
FIG. 17 is a schematic illustration of message exchange between a server and its backup servers.

In a preferred embodiment, a server has the responsibility of selecting its backup server(s). The process of selecting a backup server is generally similar to that when a server invites an existing client to become a server—the server sends a message to a client inviting the client to become a backup server and, if the client accepts this offer, the client becomes a backup server. After the server's choice is made, the backup servers must manage their relationship with the server. FIG. 17 presents the basic relation between a server and its backup servers.

The first level backup server periodically sends request messages to the server (step 1) and waits for the server's reply. When it receives a reply from the server (step 2), the first backup node also sends a report message to the second level backup server (step 3). This way, the second backup is also aware of the new structure (for example, a new address allocation made by the server). After sending the report, the first level backup server expects a reply from the second backup server (step 4) in order to confirm that the second backup server is still active.

Special consideration is made for possible failure to communicate for backup 2. A failure procedure is initiated to nominate a new backup. As the first level backup server keeps in contact with the second level backup server using periodic message exchange, it is responsible for identifying whether the second backup is still active. When the second level backup server sends no reply messages to the first backup server for a determined period of time, the first backup server assumes that the second backup server has failed or is no longer reachable and reports the situation to the server. Then, the server selects another client to act as the second backup server position and sends a message to the first level backup server informing it of the identification (address) of the client assuming the role of the new second level backup server. In this way the exchange of report messages is resumed.

On the other hand, if the second level backup server should stop receiving the periodic messages from the first level backup server, it assumes that the first level backup server has failed. Then the second level backup server assumes the role of the first level backup server and advertises this to the server. The server would then select another second level backup server.

Figure 18:
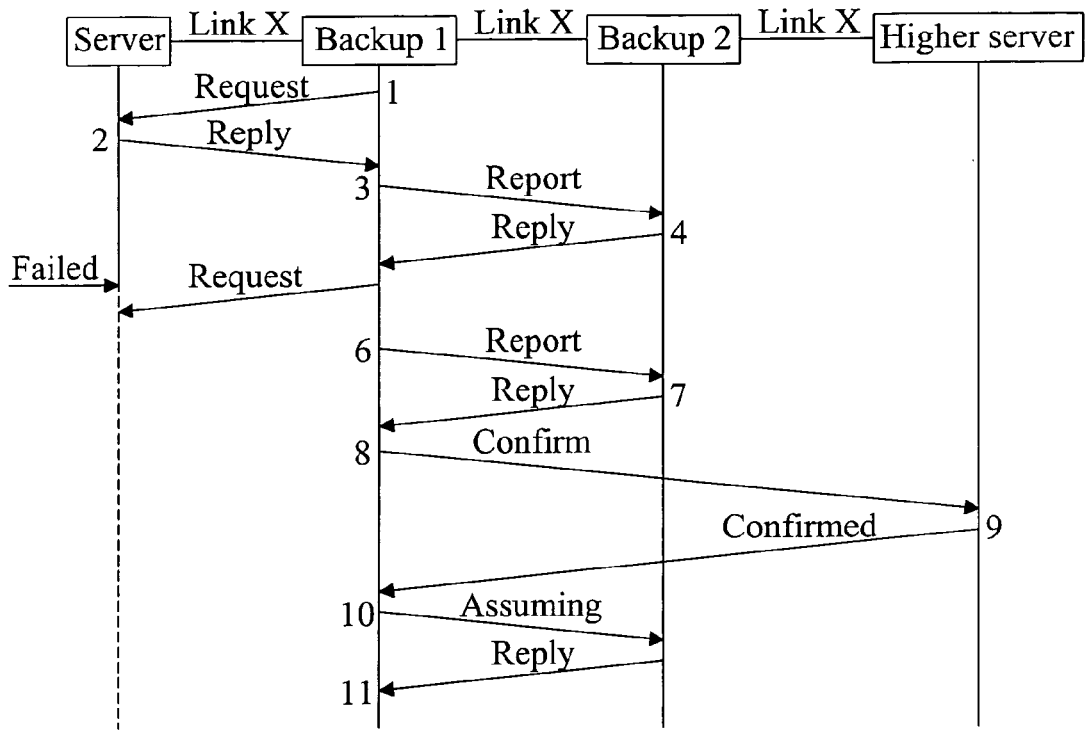
FIG. 18 is a schematic illustration of message exchange between a server and its backup servers.

FIG. 18 presents the situation where the server fails.

Steps 1-4 of FIG. 18 correspond to steps 1-4 of FIG. 17, and correspond to the server, the first backup server and the second backup server operating correctly. The first level backup server notices that the server may have failed when the server does not reply to the message from the first level backup server or reports to the first backup server. Thus, at step 5 the first level backup server sends a request message to the server but, as the server has failed, does not receive a reply from the server. After receiving no response in a set time period, including absence of server announcements, the first level backup server concludes that the server has failed (although there are other possible explanations for lack of a reply, such as failure of a communications link rather than a failure of the server) and may contact the immediately higher level server in the hierarchy to notify it has assumed the server's position (step 8), while also reporting to the second backup server (step 6) which acknowledges at step 7. The higher level server should confirm receipt of the new server notification and send a message indicating that and also reporting the failure of the previous server in its reply (step 9). The first backup server then notifies the second backup server that it is assuming the server's position (step 10), and second backup server should confirm receipt of the notification at step 11. The same simple procedure applies to any level of failure. In case of absence of a higher level server, the procedure will be followed as of above except that all steps related to the communication with the higher level server is omitted.

If the higher server did not confirm the server's failure in its reply at step 9, then it may be the case that the communication link between the server and the first backup server has failed. In this case the server itself may also detect such failure to communicate with its backup servers and trigger the selection of new backup servers. Also, if the higher server did not confirm the server failure in its reply at step 9, the first level backup server assumes that the communication link between itself and its server has failed. Then the first level backup server quits its backup role, and assumes that the server is already selecting a new client to act as its backup. This should prevent the server and the first level backup server from simultaneously starting recovery operations.

Figure 19:
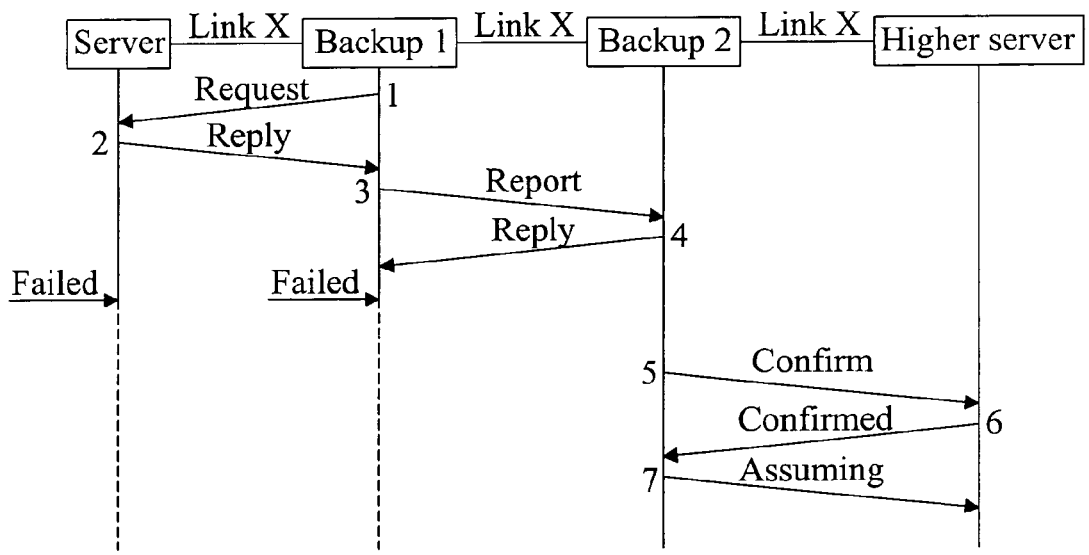
FIG. 19 is a schematic illustration of message exchange between a server and its backup servers.

FIG. 19 presents the message flow in the situation where both server and its first level backup fail.

Steps 1-4 of FIG. 19 correspond to steps 1-4 of FIG. 17, and correspond to the server, the first backup server and the second backup server operating correctly. It is then assumed that the server and the first backup server both fail.

The second level backup server has the task of periodically receiving a report from the first level backup server, assuming that the network is working properly, and replying to the first backup. If, after a determined period of time, the second backup server did not receive a report from the first backup server, it assumes that there is a possibility of a network problem. To confirm whether this is the case, the second backup server contacts the immediately higher server in the hierarchy, at step 5 of FIG. 19, to obtain confirmation of the network situation. If the higher server confirms, in its reply at step 6, that the server and the first backup server have failed, the second level backup assumes the server's position, advises the higher server at step 7, and selects two new backup servers (not shown in FIG. 19). Otherwise, if the higher server does not confirm the failure situation in its reply at step 6, i.e. the server and/or the first level backup server are still working, the second backup server assumes that it is not longer the backup server.

Other failure modes are possible in addition to those shown in FIGS. 18 and 19. For example, it is possible that the server continues to operate but that one or both backup servers fail. In this situation the server is responsible for selecting the new backup server(s) to substitute the failed server(s).

If only the first level backup server fails, the server will nevertheless loose contact with the second level backup server and so it assumes that both backup servers have failed and starts the procedure to select two new backup servers. The second backup, which is still active in the network in this case, can be selected again.

In the case that the second level backup server fails, as already described, the first level backup sends a report to the server and the server chooses another node to take the position of second level backup server.

When both first and second level backup servers fail, the server selects two nodes, based on the information it already has about its clients, to assume the backup server roles.

Figure 20:
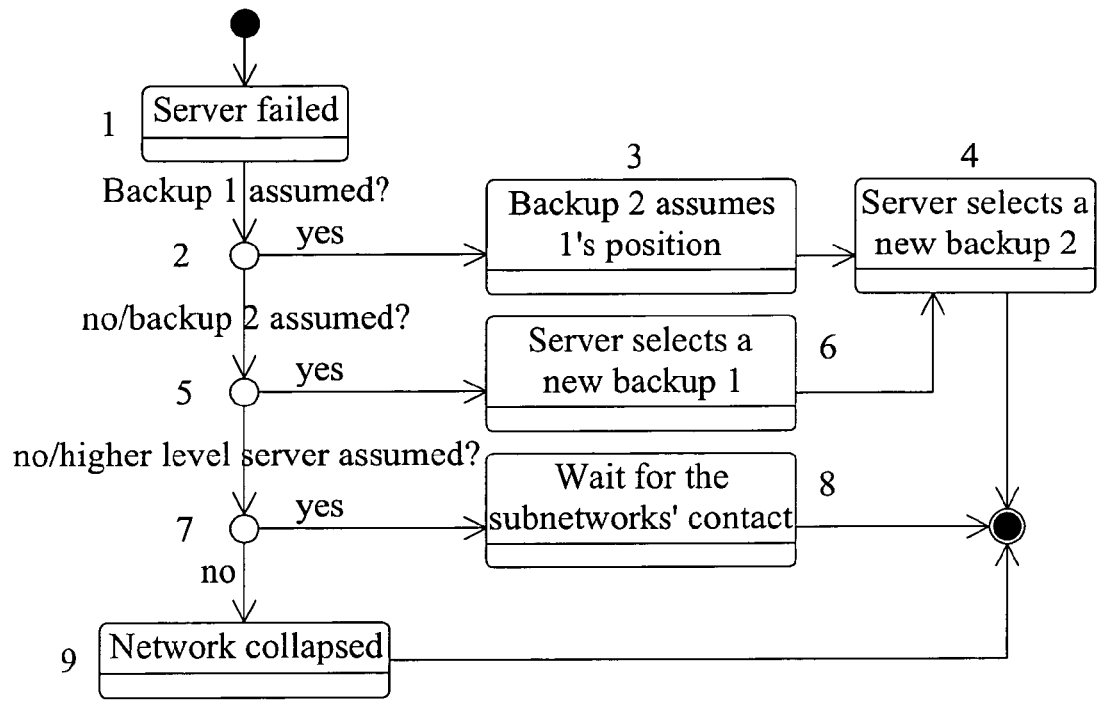
FIG. 20 is a schematic flow diagram of a method according to an embodiment of the invention.

FIG. 20 shows the state diagram when a failure of a server occurs (step 1). As already described, the first level backup server has the preference for becoming the replacement server and, if the first level backup server assumes the server role at step 2, the second level backup server assumes the first level backup server role at step 3, and the new server (i.e., the previous first level backup server) selects a new second level backup server at step 4. (If the 'old' server were to come "alive" again, it would be treated as a new node.)

If the first level backup server does not assume the server role at step 2, because it has also failed, the second level backup server may assume the server role at step 5. The second level backup will take the server's place only if the first backup server cannot assume the role of server. The new server (i.e., the previous second level backup server) selects a new first level backup server at step 6, and selects a new second level backup server at step 4.

Moreover, if the second level backup server does not assume the server role at step 5 (i.e., if neither backup server can assume the failed server's role), the higher level server (if one exists) may take over responsibility for the addressing at step 7 and manage the pool that the failed server was controlling. The higher server then waits for the subnetworks that were part of the failed portion of the network to contact it, while keeping their addresses allocation reserved for a specified period of time. If the subnetworks do not contact the higher server during this period, their address pool may be set to "free" status.

If the higher level backup server does not assume the server role at step 7, this may indicate that there is a serious problem in the network, possibly leading to collapse of the network (step 9).

Figure 24:
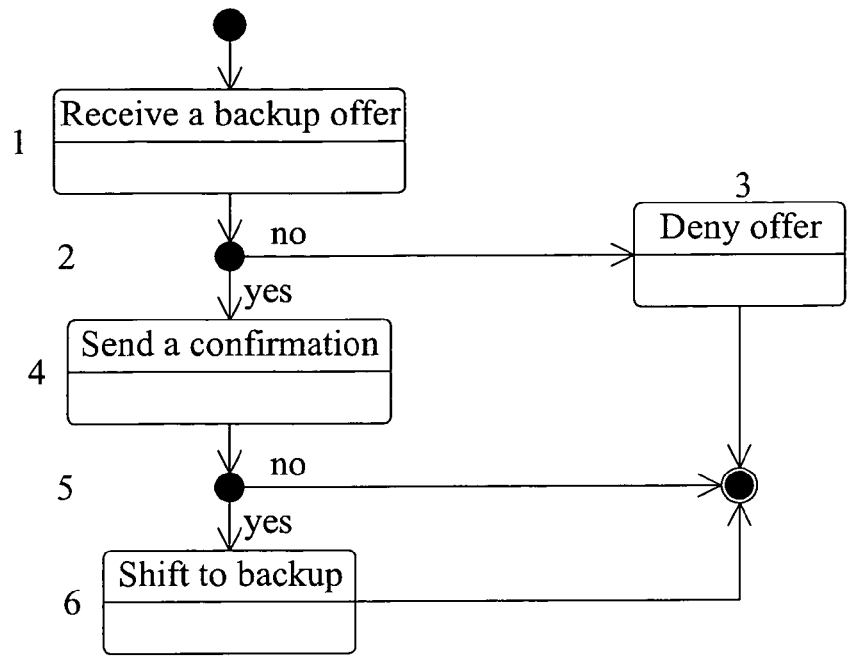
FIG. 24 is a schematic flow diagram of a method according to an embodiment of the invention.

FIG. 24 illustrates the process of a node receiving an offer to become a backup server. Initially, at step 1, a node receives (from a server of the network) an offer to become a backup server (e.g. a first level backup server or a second level backup server) to that that server.

At step 2 the node decides whether or not to accept the offer to become a backup server. If it decides not to accept the offer it replies by denying the offer (step 3).

If the node decides at step 2 to accept the offer it replies by sending, to the server, a confirmation of its willingness to act as a backup server, at step 4.

At step 5, the node determines whether it receives, from the server, a final confirmation of the offer to become a backup server. Provided that such final confirmation is received, the node assumes (step 6) the role of backup server. However, if the node does not receive a final confirmation of the offer from the server (eg within a preset time period), it assumes that the server no longer wishes it to become a backup server, and the process ends.

Network Self-Healing

Self-healing in this case is related to the situations where the communication link between a server and its higher level server fails so the subnetwork controlled by the server is isolated from the addressing control, but the hierarchy of the server and any child servers under it is maintained and so is available for re-association to the controlled network. This situation must preferably be treated in order to keep the integrity of the addressing information within the network's structure.

Figure 21:
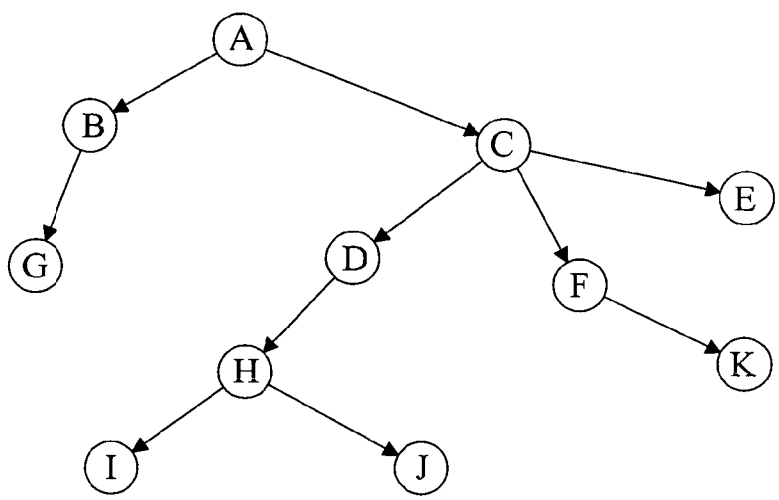
FIG. 21 is a schematic illustration of a server hierarchy.

FIG. 21 shows an example of a server hierarchy in a network. An arrow denotes a parent-server relationship, with the arrowhead denoting the dependent server—so that server A is the parent server for both server B and server C. Considering the server hierarchy presented in FIG. 21, a link failure may occur between server C and its parent server A, as an example. When the server A looses communication with server C, the entire subnetwork structure under server C is threatened since server C cannot communicate with its parent server. In a preferred embodiment, Server A does not discard immediately the possibility that server C may come back to the network. Thus, server A treats the address pool previously allocated to server C in a special way. It does not reallocate the address pool if this is not necessary. If after some time a communication link starts working again between servers A and C, server A may simply tell C to keep the same addressing configuration because the address pool is still allocated to server C.

However, when the communication link between server A and server C is re-established it may be the case that server A has already reallocated the address pool previously used by server C, for example if there was a prolonged breakdown of the link between server A and server C. In this case, server A sends new configuration information (i.e. a new address pool) to server C. Server C needs to reconfigure its own interface and reallocate addresses of the new address pool to the sub-network it heads. This structure recovering process is done level by level, i.e. after configuring server C, server C sends the new configuration to its immediately dependent servers (servers D, E and F in the network of FIG. 21). Similarly, after configuring their interfaces, servers D and F send the new configuration to their immediately dependent servers (servers H and K). Finally, server H after configuring itself sends the new configuration information to its immediately dependent servers (servers I and J), thereby completing the network's recovery process.

Server Self-Healing

The address allocation mechanism should preferably be able to recover pools of addresses from failed servers, to allow the addresses to be re-used. A preferred way to implement this is by creating a basic communication mechanism among all servers. Through this communication the servers exchange information about the addresses that they have already allocated or the pools of addresses that are still available. The mechanism of address pools distribution abovementioned is fundamental to this functionality. Every "parent server" must be updated with information from each one of its "child servers". The relation between servers (parents and children) will be explained with reference to FIG. 22.

Figures 22, 23:
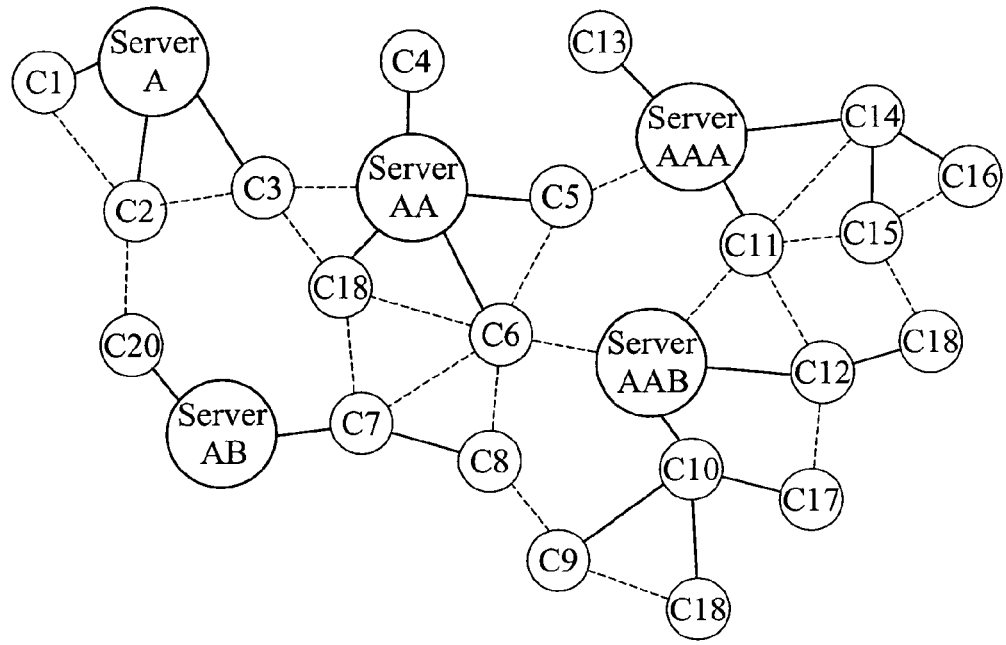
FIG. 22 is a schematic illustration of a server hierarchy.
FIG. 23 illustrates address pools within a server hierarchy.

In FIG. 22 the server's hierarchy is organized in the following way: Server A is the parent of Server AA and Server AB; and Server AA is parent to Server AAA and Server AAB. All other nodes (C1 . . . C20) are client nodes to one of these servers. The bold lines in FIG. 22 represent the association between servers and their clients.

By keeping information about its "child servers", a "parent server", when detecting that the child server has failed, can re-assume the address pool that was previously allocated to the child server. For example, in FIG. 22, if Server AAB fails, the Server AA (the parent server of server AAB) re-assumes the address pool previously allocated to server AAB.

However, when the address pool of a "child server" is re-assumed by the parent server, the parent server preferably would be aware that some of addresses in the child server's address pool may have in turn been allocated to other servers, and preferably does not completely re-assume these addresses. This embodiment requires that the parent server receives information about which addresses the child server allocates to other servers while the child server is in use and communicating with the parent server. This way, two divided parts of the network will not propagate over equal address pool. For example, in FIG. 22, if the Server AA fails, the Server A would take back the address pool previously allocated to server AA. However, in this embodiment the components of this address pool, i.e. smaller address pools, which were allocated to Server AA's child servers (server AAA and server AAB), should not be part of the address pool reallocated to the Server A. That is, only those addresses that were allocated to server AA and that were not allocated to a child server by server AA should be taken back—addresses that server A is aware of having been allocated by server AA to server AAA or server AAB would continue to be treated as reserved and would not be taken back by server A. In this way, the invention ensures that two divided parts of the network will not overlap. Following the network structure presented in FIG. 22, FIG. 23 presents the interaction among the address pools of servers A, AA, and AAA.

In the example of FIG. 23, the address pool of server A is divided into sub-pools (see the left part of FIG. 23), with addresses in sub-pool 1A being allocated directly to clients of server A, addresses in sub-pool 2A being allocated to server AA, addresses in sub-pool 3A being allocated to server AB, and so on. Considering both the relationship illustrated in FIG. 23, and the scenario where Server AA fails, Server A must take back the responsibility over its address pool 2A, previously allocated to Server AA.

However, Server A must be aware that part of the allocated address pool, when under responsibility of Server AA, was further allocated to Server AAA. This is shown in the centre part of FIG. 23—the address pool of server AA is divided into sub-pools, with addresses in sub-pool 1AA being allocated directly to clients of server AA, addresses in sub-pool 2AA being allocated to server AAA, addresses in sub-pool 3AA being allocated to server AAB, and so on. Therefore, when taking back responsibility for the control over its second address sub-pool 2A, Server A may only manage the part of the address sub-pool 2A that was not reallocated to other servers—so server A should not manage address sub-pool 2AA (allocated to server AAA) or address pool 2AB (allocated to server AAB). In FIG. 23, if Server AA fails, the set of addresses of the recaptured pool (RP) by the Server A will be:

RP=(Pool #2A)∩(Allocated pools by Server AA) or
RP=(Pool #2A)−(Allocated pools by Server AA)

The method of FIG. 22 is an alternative to the method of FIG. 21. In the method of FIG. 21 server A re-allocates all addresses allocated to server C upon failure of server C or loss of communication with server C, including addresses that server C has sub-allocated to servers D, E and F.

Servers Bridging Communication

A server can also work like a bridge (although often a client can bridge a communication between a server and a more than 1-hop distant client.) For example, when a new node has a 1-hop association with a Server A, but this server cannot assume more clients, because of a lack of addresses for instance, and the Server A also has a 1-hop association with another server (server B), it can bridge the communication between the new node and Server B. In this scenario the Server A only relays the messages sent by the new node to Server B and vice-versa.

If server A recovers the capability to assume more clients, Server A can offer to the bridged client to get associated to it, thereby decreasing the number of necessary hops for the client to reach a server. If the client accepts this offer, an association is negotiated between server A and the client and, after establishment, the client sends a message for cancelling the lease to Server B.

Server Changing

When a client that is already associated to a Server A receives a broadcast announcement from a second server, Server B, and identifies that Server B is nearer than Server A (ie that server B can be reached in fewer hops than server A), the client can opt to change its server. A scenario where this can occur is when an overloaded server decides to divide its workload with one of its clients (preferably with a client that is more than 1-hop distant). When the chosen client becomes a server, the first action it takes is to announce itself to the network. A node that is closer to this new server than to its current server can opt to change its server to server B by negotiating a new association.

The method of the invention may be applied to any dynamic network (that is a network in which nodes join and leave the network over time).

Figure 25:
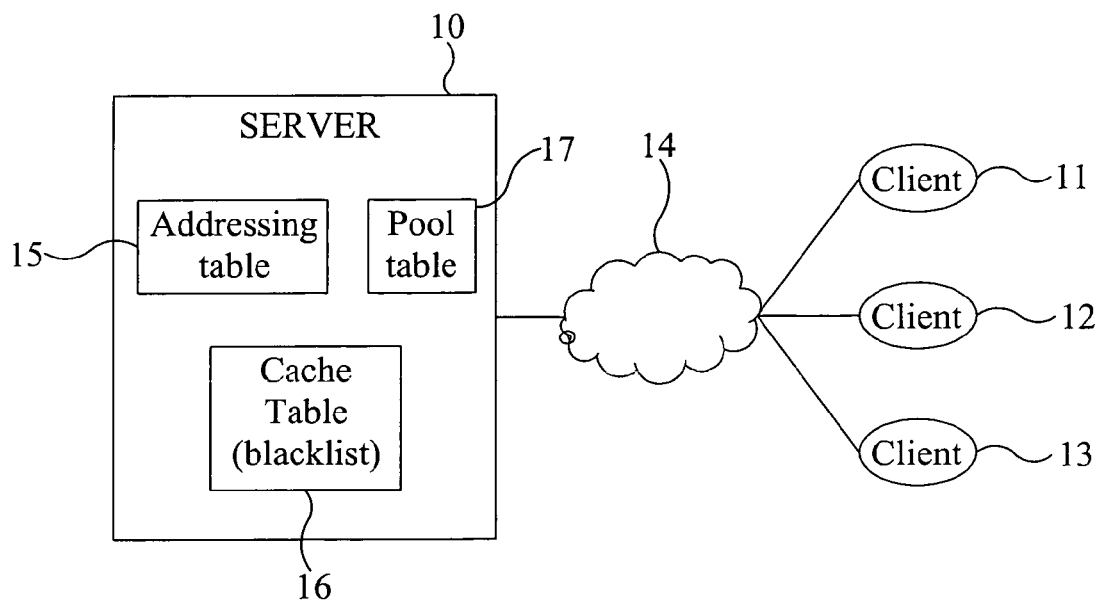
FIG. 25 is a schematic diagram of a network node of the invention.

FIG. 25 illustrates a network node of the invention. The network node 10 is shown acting as a server, and is associated to one or more clients 11-13 via a network 14. The network node 10 has an address table 15, which contains all network addresses currently allocated to the network node 10 and indicates the status of the addresses—for example whether the addresses are "free", "allocated" or "reserved" (where "reserved indicates that the network node 10 is currently in the process of offering that address to another node).

The network node 10 further has a blacklist 16, for example in the form of a cache table. This lists, for example, nodes for which the network 10 has previously denied a request (for example at step 3 of FIG. 3).

The network node further comprises a pool table 17. This may, for example, be used to hold information about address pools that the network node has further allocated to other servers—including, as an example, information about address pools that the network node has allocated to a child server and which the child server has in turn allocated to one or more of its child servers (for example as shown in FIG. 23). If the child server fails or communication with the child server is lost and the network node 10 is required to take back the addresses allocated to the child server, it may use the information in the pool table 17 to carry out the method of FIG. 22, in which it takes back only addresses that are allocated to the child server and which the child server has not further allocated to one of its child server.

The network node 10 is suitably programmed to carry out the methods of the invention. The network node may, for example be programmed using a computer-readable medium containing instructions that, when executed on a processor of the network node (not shown), cause the processor to perform a method of the invention. Alternatively, the network node may be programmed via the network 11, or at manufacture.

The invention claimed is:

1. A method of dynamic address allocation in a network, the method comprising:
    sending an association request from a first node device to the network;
    receiving, at the first node device, a response from a node device of the network;
    determining, at the first node device, whether the received response is from a client node device of the network or a server node device of the network;
    the first node device associating to the network as a client device or as a server device in accordance with the response received;
    determining, from negotiations between node devices, whether the first node device, which is not currently assigned a server role responsible for distribution and management of network addresses to client devices, shall assume the server role; and
    if the first node device shall assume the server role, providing the first node device with a pool of network addresses.

2. The method of claim 1, wherein providing the first node device with the pool of network addresses comprises providing the first node device with the pool of network addresses from a server node device if the determination is that the first node device shall assume the server role.

3. The method of claim 2, further comprising, upon receipt of an indication that the first node device is no longer assigned the server role, subsequently re-assuming, at the server node device, responsibility for the pool of network addresses provided to the first node device upon the first node device assuming the server role.

4. The method of claim 3, further comprising waiting, at the server node device, for a pre-determined time period after receipt of an indication that the first node device is no longer assigned the server role before re-assuming responsibility for the address pool.

5. The method of claim 3, wherein the server node device does not re-assume responsibility for addresses in the first address pool that the first node device has allocated to one or more further servers.

6. The method of claim 5, further comprising electing, at the first node device, at least one of its client node devices as a backup server device.

7. The method of claim 1, wherein the determination is carried out:
    at start-up of the network;
    upon the first node device requesting association to the network;
    upon a server node device of the network becoming overloaded; or
    at an occasion of a server node device of the network leaving the network.

8. The method of claim 1, wherein the determination is carried out upon the first node device associating to the network, the method further comprising, if the determination is that the first node device does not assume a server role, offering the first node device a client role in the network.

9. The method of claim 1, wherein the first node device comprises a client node device of the network.

10. The method of claim 1, wherein if the determination is that the first node device shall assume the server role, subsequently providing the first node device with a further pool of network addresses.

11. The method of claim 1, further comprising:
    if the first node device receives a response from a server node device of the network, the first node device associating to the network as a client device or as a server device as determined from negotiations between the first node device and the server node device.

12. The method of claim 1, further comprising:
    if the first node device receives no response from a server node device of the network but receives a response from a client node device of the network, the first node device associating to the network as an n-hop client, where n>1.

13. The method of claim 1, further comprising the first node device subsequently electing at least one node device of the network as a backup server device if the determination is that the first node device shall assume the server role.

14. The method of claim 1, wherein the negotiations between nodes comprise:
    transmitting, from a second node to the first node, a request that the first node assume the server role.

15. A network node, the network node comprising processing circuitry configured to:
    receive, from a first node, a request to associate to the network;
    send a response to the first node, the response causing the first node to
    determine whether the response is from a client node device of the network or a server node device of the network; and
    associate to the network as a client or as a server in accordance with the response;
    determine, from negotiations between nodes, whether the first node, which is not currently assigned a server role responsible for distribution and management of network addresses to clients, shall assume the server role; and
    if the first node shall assume the server role, arrange for the first node to be provided with a pool of network addresses.

16. The network node of claim 15, wherein the processing circuitry is configured to determine whether the first node shall assume the server role:
    at start-up of the network;
    upon the first node requesting association to the network;
    upon a server node of the network becoming overloaded; or
    at an occasion of a server node of the network leaving the network.

17. The network node of claim 15:
    wherein the processing circuitry is configured to determine whether the first node shall assume the server role upon the first node associating to the network; and wherein the processing circuitry is further configured to offer the first node a client role in the network if the determination is that the first node shall not assume the server role.

18. The network node of claim 15, wherein the network node is further configured to, upon a determination that the first node shall assume a server role, subsequently provide the first node with a further pool of network addresses.

19. The network node of claim 15, wherein the network node comprises a server node, and is configured to send a response that causes the first node to associate to the network as a client or as a server as determined from negotiations between the first node and the node.

20. The network node of claim 15, wherein the network node comprises a client node of the network and is configured to send a response that, if the first node receives no response from a server node of the network, causes the first node to associate to the network as an n-hop client, where n>1.

21. The network node of claim 15, wherein the negotiations between nodes comprise receipt, at the first node, of a request that the first node assume the server role.

22. A non-transitory computer-readable medium comprising non-transient instructions that, when executed on a processor, cause a network node to:
  receive, from a first node, a request to associate to the network;
  send a response to the first node, the response causing the first node to
  determine whether the response is from a client node device of the network or a server node device of the network; and
  associate to the network as a client or as a server in accordance with the response;
  determine, from negotiations between nodes, whether the first node, which is not currently assigned a server role responsible for distribution and management of network addresses to clients, shall assume the server role; and
  if the first node shall assume the server role, arrange for the first node to be provided with a pool of network addresses.

* * * * *